(12) United States Patent
Chambers

(10) Patent No.: US 10,725,559 B2
(45) Date of Patent: Jul. 28, 2020

(54) HIGH ACCURACY TRACKING SYSTEM FOR INTERACTIVE EQUIPMENT IN VIRTUAL AND AUGMENTED REALITY SIMULATORS AND OPERATIONAL EMPLOYMENT

(71) Applicant: Christopher M. Chambers, Oviedo, FL (US)

(72) Inventor: Christopher M. Chambers, Oviedo, FL (US)

(73) Assignee: Serious Simulations, LLC, Orlando, FL (US)

( * ) Notice: Subject to any disclaimer, the term of this patent is extended or adjusted under 35 U.S.C. 154(b) by 0 days.

(21) Appl. No.: 15/962,751

(22) Filed: Apr. 25, 2018

(65) Prior Publication Data

US 2018/0314344 A1 Nov. 1, 2018

Related U.S. Application Data

(60) Provisional application No. 62/489,498, filed on Apr. 25, 2017.

(51) Int. Cl.
*G06F 3/03* (2006.01)
*F41G 3/26* (2006.01)
*G06F 3/01* (2006.01)
*F41G 3/30* (2006.01)

(52) U.S. Cl.
CPC .............. *G06F 3/0312* (2013.01); *F41G 3/26* (2013.01); *F41G 3/30* (2013.01); *G06F 3/011* (2013.01)

(58) Field of Classification Search
CPC ... F41G 3/26; F41G 3/30; G06F 3/011; G06F 3/0312; G01B 11/26
See application file for complete search history.

(56) References Cited

U.S. PATENT DOCUMENTS

| | | | |
|---|---|---|---|
| 2005/0177054 A1* | 8/2005 | Yi ......................... | A61B 5/055 600/510 |
| 2013/0211594 A1* | 8/2013 | Stephens, Jr. .......... | B25J 9/1689 700/259 |
| 2018/0071874 A1* | 3/2018 | Bergeron ................. | B23Q 1/54 |

* cited by examiner

*Primary Examiner* — Nelson M Rosario
(74) *Attorney, Agent, or Firm* — Maxwell L. Minch; Maxwell L. Minch Esq. PA

(57) ABSTRACT

The present invention provides devices, methods and systems for use with interactive equipment in a simulated or augmented environment, or in real world operations. The inventive devices, methods and systems allow for interactive operation equipment in a virtual or augmented reality environment while eliminating virtual drift of the operational equipment. The present invention further eliminates the need to reset a simulated environment to accommodate swapping out equipment, allowing a seamless simulation to provide an optimal virtual training environment. Finally, the present invention provides for a highly accurate operational equipment to be used in a virtual or augmented environment allowing for optimal training, while minimizing down time.

13 Claims, 1 Drawing Sheet

HIGH ACCURACY TRACKING SYSTEM FOR INTERACTIVE EQUIPMENT IN VIRTUAL AND AUGMENTED REALITY SIMULATORS AND OPERATIONAL EMPLOYMENT

CROSS-REFERENCE TO RELATED APPLICATION

This claims priority from U.S. Provisional Application No. 62/489,498, filed Apr. 25, 2017, which is incorporated by reference herein in its entirety.

FIELD OF THE INVENTION

The present invention relates in general to device tracking and in particular to highly accurate interactive device tracking in a virtual or augmented reality system, and in such cases as the interactivity applies to operational uses.

BACKGROUND OF THE INVENTION

Simulation, virtual reality and augmented reality is a growing industry and stands to supplement, and in some cases, replace conventional training atmospheres. Using these unique technologies, real-time interaction is imperative in order for a user to become immersed in the computer environment. Thus the primary goal when creating any simulation, virtual reality or augmented reality environment is to ensure a seamless simulated environment. The slightest lag, interruption, or required break in such environments can ruin or interrupt the environment, thus making such training ineffective. Operational uses of tracking devices, particularly for combat equipment such as machine guns and other devices requiring positional accuracy, require similar or better performance as interactive training devices.

Advancements in the communication lag between the information source and simulated environment displays are disclosed in Publication No. WO 2016/205800, published Dec. 22, 2016, the contents of which are incorporated by reference. However, issues in providing an uninterrupted simulated environment arise when equipment is used in an augmented or virtual reality environment, or in operational circumstances.

The current systems and methods employed for tracking positions of interactive equipment use inertial measurement unit sensors (IMU) which employ combinations of magnetometers, accelerometers, and gyroscopes to determine an equipment's position in a simulated environment. These IMU's are affixed directly to the equipment or the simulated equipment.

One issue is that the position information of the interactive equipment, such as (but not limited to) turrets, guns, or tools must be tracked such that a user movement of the interactive equipment can be tracked in the simulated or augmented environment. Problems occur in the current methods such as position drift. Position drift is a condition where the real object's position is different from the virtual representation of the object, and/or the virtual object moves or drifts without physical movement. This often occurs as a result of a current IMU sensor mounted directly on the equipment. These sensors can introduce significant drift which requires frequent resets during training, and loss of confidence of trainees concerning accuracy, as well as loss of the mental immersion impact of virtual training. This is particularly prominent in weapon engagement training.

In order to correct the drift induced by IMUs and other sensors, existing equipment tracking devices and methods usually require a complete reset of the simulated environment and calibration of the equipment tracker in order to bring the equipment back online in the training environment such that the equipment can reestablish a point of reference which is then input back in to the simulated environment. It should be appreciated that this causes loss of valuable training time, interrupting training scenarios, and degrading training outcomes.

Another common occurrence in simulated scenarios using interactive equipment is that users may want to change out the interactive equipment being used, (such as changing weapons). With the current equipment tracking methods and sensors, users must reattach and recalibrate the tracking system, again causing more non-training time and additional labor expenditure.

As is the case for all training of weapons and targeting devices, as well as operational employment of weapons and targeting devices, high accuracy is required. Some sensors and trackers, such as IMUs, are only accurate to within a few degrees, which can cause errors in 10's of meters off target, or the tracking device accuracy is less than the actual weapon accuracy, which is unacceptable. Therefore, there exists a strong need for high and consistent accuracy for weapon tracking systems for training and operations.

Thus there remains an unmet need to provide a tracking system or method for interactive equipment in a simulated or augmented environment, or for operational uses, that does not have drift, is highly accurate, allows for swapping out equipment without having to reset, and can be powered off or on in a simulated environment without having to reset the simulated or augmented environment.

SUMMARY OF INVENTION

The present invention provides devices, methods and systems for use with interactive equipment in a simulated or augmented environment, or in real world operations. The inventive devices, methods and systems allow for interactive operation equipment in a virtual or augmented reality environment while eliminating virtual drift of the operational equipment. The present invention further eliminates the need to reset a simulated environment to accommodate swapping out equipment, allowing a seamless simulation to provide an optimal virtual training environment. Finally, the present invention provides for a highly accurate operational equipment to be used in a virtual or augmented environment allowing for optimal training, while minimizing down time.

The present invention utilizes a set of gears at least one, if not all, rotational axes of the equipment mounting device. In concert with the gears at the rotational axis, at least one encoder having an encoder engagement gear is used. The encoder engagement gear interfaces with the rotational axis gear. In at least one embodiment where an absolute optical encoder with multiple turn capability is used, the encoder engagement gear includes within its housing a disk which provides a unique code for each of the encoder's positions in a 360 degree rotation, and the multiple turn capability further provides for an absolute position of the gear.

The advantage of the use of the absolute encoder is to precisely provide an exact position of the equipment being moved in a simulated or augmented environment, or in real operations. The combination of the gear ratio and encoder accuracy yield an accuracy of the tracker to movements of $\frac{1}{100}^{th}$ of a degree. Thus the advantages of the inventive systems and methods described herein are that they provide zero internal drift which will not require any resets during training, only external physical movement of the equipment/device mount will move the reader, higher accuracy than current methods employed (IMU's), and it may be easily installed as an applique package to legacy systems with minimal down time.

BRIEF DESCRIPTION OF THE DRAWINGS

The present invention is further detailed with reference to the following figures. These figures are not intended to be a limitation on the scope of the invention, but rather to illustrate specific aspects of the invention.

FIG. 2 further illustrates at least one embodiment having a slit (yellow) in the rotational axis gear which allows for light to be sensed by one or more optical sensors for auto-calibrating the device or system.

DETAILED DESCRIPTION OF THE INVENTION

Figure 1:
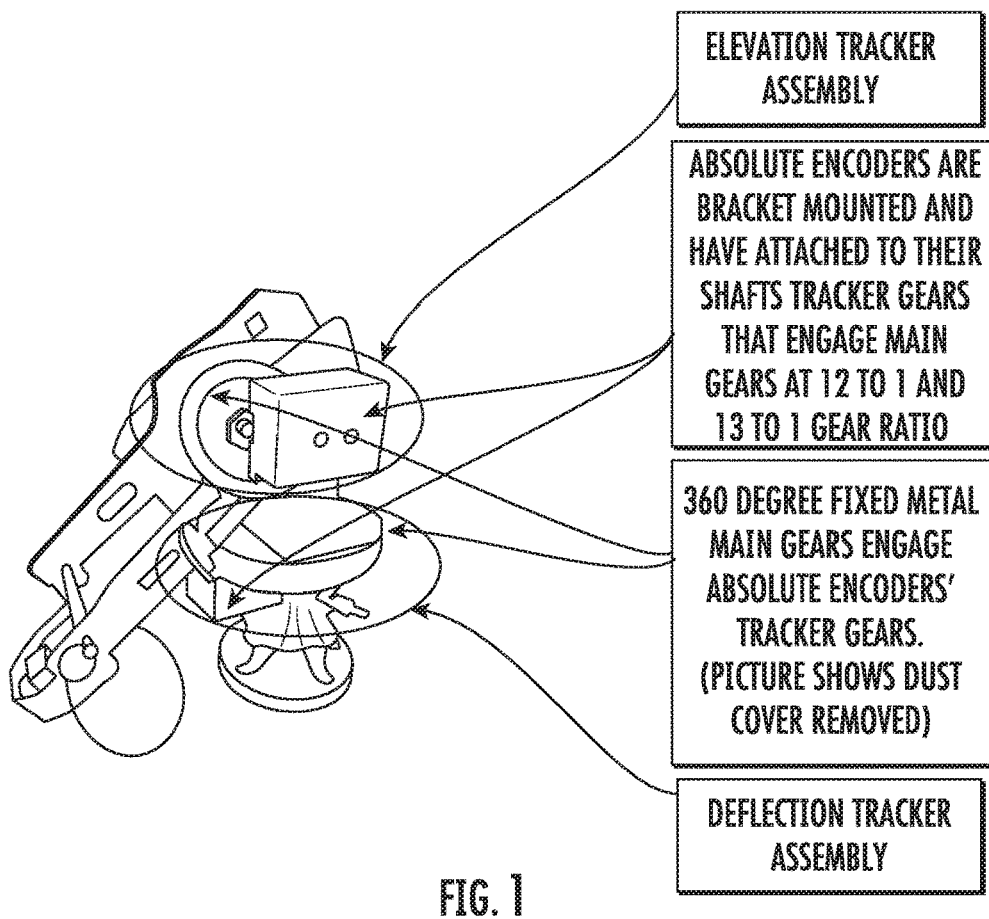
FIG. 1 provides an illustration of at least one embodiment of the inventive device mount for holding equipment to be interactively used in a virtual reality or augmented reality setting, illustrating one encoder for the base portion (deflection tracker assembly) and at least one encoder for use with the equipment holding portion (elevation tracker assembly).

The present invention has utility at providing a device and method for a tracking system or method for interactive equipment in a simulated or augmented environment, or in real world operations, that does not have drift, allows for swapping out equipment without having to reset, is highly accurate, and can be powered off or on in a simulated environment without having to reset the simulated or augmented environment. The present invention utilizes a set of gears at least one, if not all, rotational axes of the equipment mounting device. In concert with the gears at the rotational axis, at least one encoder having an encoder engagement gear is used. In at least one embodiment the encoder is an absolute optical encoder with multiple turn capability. The encoder engagement gear interfaces with the rotational axis gear. In at least one embodiment where an absolute optical encoder with multiple turn capability is used, the encoder engagement gear includes within its housing a disk which provides a unique code for each of the encoder's positions in a 360 degree rotation, and the multiple turn capability further provides for an absolute position of the gear. In at least one embodiment the encoder has 4096 positions in a 360 degree rotation. The advantage of the use of the absolute encoder is to precisely provide an exact position of the equipment being moved in a simulated or augmented environment, or in real operations. The combination of the gear ratio and encoder accuracy yield an accuracy of the tracker to movements of $1/100^{th}$ of a degree. Thus the advantages of the inventive systems and methods described herein are that they provide zero internal drift which will not require any resets during training, only external physical movement of the equipment/device mount will move the reader, higher accuracy than current methods employed (IMU's), and it may be easily installed as an applique package to legacy systems with minimal down time.

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

As used herein "equipment" shall mean any hardware known in the art that is desired to be used in a simulated environment. Without being limited to any particular equipment, examples of equipment to be simulated include guns, machine guns, targeting devices, weapons, turrets, sports equipment, tools, and vehicles.

As used herein "real-time" or "real time" shall mean the transition time for implementing the input signal into the simulation being less than 1 full frame of the simulated environment.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Device Mount

A device mount for holding equipment to be interactively used in a virtual reality or augmented reality setting is provided. The device mount includes a base portion and an equipment holding portion. The device mount further includes at least one axis of rotation on the base portion, on the equipment holding portion, or at the connection point between the base portion and the equipment holding portion. In addition the at least one axis of rotation includes at least two gears, so as to improve the accuracy of measuring the movement of the equipment. An absolute optical encoder with multiple turn capability is used in conjunction with said rotational axis gear wherein the gear from the encoder interfaces with the gear on the axis of rotation. The gear on the encoder turns with the gear on the axis of rotation as the equipment mount is moved along the horizontal axis (deflection angle) or the vertical axis (altitude angle). Each encoder determines the position of the device mount based on the position of the encoder engagement gear. Each encoder communicates the gear position data of the altitude or deflection from the encoder to at least one processor which determines the direction of the device in three dimensional space. This data is integrated into a virtual reality or augmented reality program for real-time interactive response, or in operational employments, can be memorized and used to drive motors in order to return the equipment to various positions of importance (such as pre-planned targets). The device allows for the integration of training or real equipment to be accurately represented in a simulated environment, while using extremely accurate position tracking information that cannot possibly cause drift of the equipment in the simulated environment. At least one embodiment of the inventive device mount is illustrated in FIG. 1.

It is understood that a base portion and an equipment portion are interconnected, but nothing herein shall limit a particular device mount to being restricted to have either portion, or be limited for including additional portions. Where used, a base portion can be mounted to a different surface and may allow for the device mount to standalone. This allows the use of the device mount by a user in a simulated environment and prevents it from falling over, or simulates its actual setup in a real environment. The equipment portion is used for holding the particular equipment desired to be used in the simulated environment. The equipment portion and the base portion may be rigidly connected, or may be connected pivotally or hingedly, depending on the particular degrees of freedom needed to operate the equipment in the simulated environment in the same fashion that the equipment would be operated in the real world.

Choosing the axis of rotation will depend on the specific type of equipment that is incorporated with the device mount, and its normal use in the real world. Without being bound to a particular embodiment, a turret or gun mount may have an axis of rotation at the angle of deflection and the angle of altitude. Other equipment, including certain gun mounts or turrets, may only have one axis of rotation, or a plurality axis of rotation. The limiting factor of the number of axes of rotation on a particular device mount largely depends, and is particularly chosen, on the degrees of freedom that the piece of interactive equipment being used in the simulated environment has in the real world. In at least one embodiment the base portion of the device mount has at least one axis of rotation for rotating the equipment portion on said axis of rotation of the base. In at least one embodiment the equipment portion of the device mount has at least one axis of rotation for rotating the equipment on said axis of rotation of the equipment. In yet at least one embodiment, a plurality of axis of rotation are used with the base portion, equipment portion, or the interconnection therebetween. It is appreciated while there may be more than one axis of rotation in a device mount, a gear does not always have to be incorporated, nor nothing herein shall limit the invention to using only the described tracking for every axis of rotation of a device mount. Notwithstanding, any axis of rotation that is to be tracked using the inventive systems and methods herein will incorporate a gear to rotate about said axis such that the gear on the axis of rotation may be interfaced with the gear of an encoder.

It is appreciated that any absolute optical encoder with multiple turn capability may be used as an encoder of the claimed invention. In at least one embodiment an absolute optical encoder with multiple turn capability is used. One advantage of using an absolute optical encoder with multiple turn capability allows for high accuracy position tracking, and when combined with gears affixed to the equipment, physically prevents any unwanted drift of the equipment in the simulated environment, or between the equipment's real direction versus the computer's recorded direction. In at least one embodiment, an absolute optical encoder with multiple turn capability is used which has a unique digital output for each of 4096 shaft positions that provides true, relative and absolute, position regardless of power interruptions. The code disk for an absolute encoder uses an absolute track with straight binary, binary coded decimal, or gray code to provide absolute position data. Upon a loss of power, the encoder will provide the correct absolute position when power is restored. Absolute optical encoders with multiple turn capability are used for packaging machines, robotics, lead/ball screw, and pick and place applications, to name a few. Gray code provides the most reliable high speed positioning at the lowest cost. Optical versions are also available with multi-turn capability. Nothing herein is intended to limit the optical encoder used, absolute, or otherwise.

In at least one embodiment, the gear at the axis of rotation rotates with the equipment. A small gear, engaged by the large gear, is attached to the encoder. Where certain absolute encoders are used, the position encoder outputs from 2 to 4096 binary values per revolution, providing high resolution, repeatable, measurements of the angle of rotation of the equipment. A microprocessor receives the values outputted by the encoder and provides that information to an external software program over a wired data link. Wireless data links are also easily employed.

Figure 2:
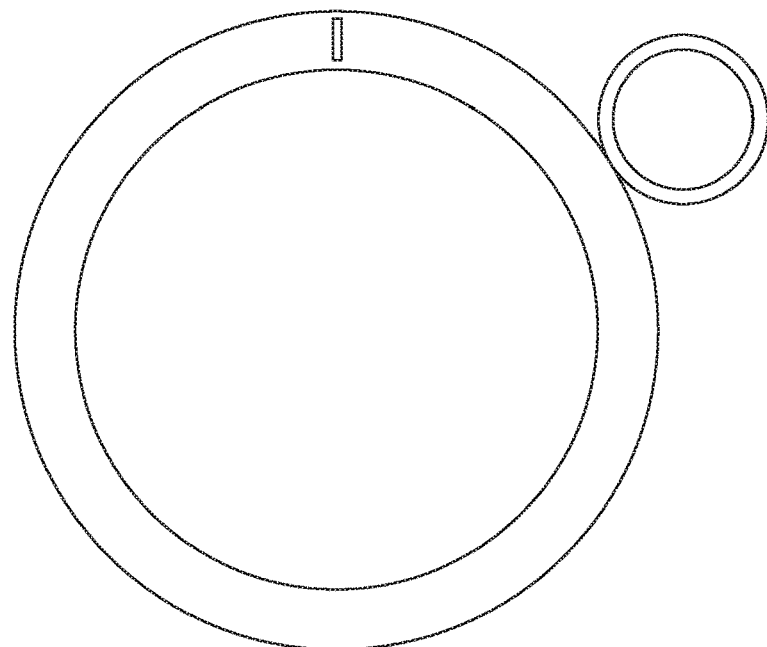
FIG. 2 illustrates the relationship of the rotational axis gear (blue) and the encoder engagement gear (brown).

In at least one embodiment, the gear at the axis of rotation can be used in conjunction with an optical sensor, as either part of the encoder or as a separate system, for providing at least one calibration point. Providing a calibration point allows for the device mount to calibrate within the system. In at least one embodiment where an optical calibration mark is used, a narrow slit in the gear at the axis of rotation will expose an LED to an optical detector/sensor on the other side of the gear. As a result, when the optical detector/sensor detects the LED's light, the position of the large gear will be known. In this way, the LED/optical sensor combination serve as a calibration reference. Software reading the value of the encoder (on the small gear) can then recalibrate each time the gun mount moves over the calibration point. FIG. 2 illustrates at least one embodiment of where optical calibration is used. There are many other possible methods of initial calibration depending on the particular set-up, or existence of other devices on the equipment, such as lasers, which can easily be employed to provide the initial calibration point by referencing a laser strike on a known point in the real world.

Position data of the axis of rotation from the one or more encoders is then communicated for processing and integration into the simulated environment in real time. In at least one embodiment, an external microprocessor is used for processing the encoded position information and local calculation of the position and angles. The Absolute Encoder sends multiple byte commands with each update. These are serialized commands that are transmitted over a Serial Encoder Interface (SEI) bus that is converted to the serial communications (COM) port on the host computer via the Universal Serial Bus (USB). The byte data sent encapsulates the device identification and its position status at the time of the poll. This data, once it is received by the host computer is then translated to rotational data within a simulation/game programming code. This is accomplished by the serial data being converted into quaternion data, which modifies the axis of the simulation object which represents the equipment (the machine gun for example). The two absolute encoders each control, with great accuracy, one axis of the simulation object's movement. The azimuth encoder translates to rotation of the Y-axis of the simulation object. The elevation encoder translates to rotation of the Z-axis of the simulation object. Once the position data is processed, the image generator for the simulated environment presents the visuals to the trainee's display. In the case of an operational use of the data, the integration of position data is made with a motor control unit mounted on the gun, or an electronic visual indicator for the person employing the equipment (i.e. machine gun) for use in real environments.

Equipment Tracking System and Method

A system and method for zero drift equipment position tracking in a simulated (virtual reality or augmented reality) or real environment is also provided. The system and method includes the use of the inventive device mount described herein, wherein the device mount has at least one axis of rotation. The system and method further includes attaching at least one absolute optical encoder with multiple turn capability having at least one encoder engagement gear to at least one gear on at least one axis of rotation of the device mount. Position information related to the device mount, its angle of deflection, its angle of altitude, or combinations thereof, are communicated to a processor for processing the position information and communicating the position information to an image generator in real-time to a simulated environment.

Operational Uses

It is appreciated, and discussed above, that the devices, systems and methods herein described may alternatively be used for remote operation of equipment deployed in an operational environment. In such embodiments, said equipment mount, as described herein, may further comprise of a communication system for receiving position information from a remote computer. The device mount would further be moved at one or more axis of rotation by a motor receiving a signal from the communication system.

In such embodiments, the communication system would receive position information from a remote location. In at least one embodiment, said received position information is sent from a remote computer through a communication network to the communication system. The communication network may be any wireless communication system known in the art. Alternatively the communication network may be a signal wired to the equipment decoder receiving information from a remote location, such as (and intending to be non-limiting) the inside of a vehicle holding the equipment mount. Thus in at least one embodiment, the communication system receives position information from the remote location, transcodes the received position information using at least one processor, compares the position information received from the encoders, and moves the equipment via each axis of rotation by a motor until said received position information matches the encoder position information.

EXAMPLES

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Example 1—Equipment Holding Device in Virtual Environment

A device mount for holding equipment to be interactively used in a computer simulated environment is provided. A machine gun is affixed to the equipment holding portion of the device mount. An axis of rotation is placed at the base of the equipment mount for positioning the azimuth angle of the equipment, while a second axis location of the device mount is at the equipment holding portion for positioning the angle of altitude of the machine gun. An absolute optical encoder with multiple turn capability is used at each axis of rotation, where the encoder engagement gear includes within its housing a disk which provides a unique code for each of the encoder's 4096 positions in a 360 degree rotation. The user is immersed in a simulated environment where the equipment is shown and available for use, and corresponds to actual hands-on equipment being held by the device mount in the real world. The user in the simulated environment approaches the equipment in the simulation and operates the equipment by operating the device mount in the real world. As the user positions the machine gun in the simulated environment, each optical encoder generates position information based on the movement of the gears at each axis of rotation. The position information is communicated to a processor which communicates and integrates the position information into the simulated environment in real-time. While remaining in the simulated environment neither the position of the equipment holding portion or the base holding portion drifts whether the equipment is in use or not in use. The only way for the position of the equipment in the simulated environment to move is through actual movement of the equipment device.

Example 2—Motor Operated Equipment Holding Device in Operational Environment

A device mount for holding equipment to be remotely operated in an operational setting is provided. A machine gun is affixed to the equipment holding portion of the device mount. An axis of rotation is placed at the base of the equipment mount for positioning the azimuth angle of the equipment, while a second axis location of the device mount is at the equipment holding portion for positioning the angle of altitude of the machine gun. An absolute optical encoder with multiple turn capability is used at each axis of rotation, where the encoder engagement gear includes within its housing a disk which provides a unique code for each of the encoder's 4096 positions in a 360 degree rotation. The device mount is mounted to the exterior of an M1 Abrams Tank, and connected by wire to a computer internal to the tank cockpit.

The operator enters the desired position information into the remote computer. The information is communicated by wire to the communication system on the device mount. The communication system receives position information from the encoders, position information from the remote computer, and operates each axis of rotation using a motor until the position information on the encoder matched the received position information from the remote computer. The position of the equipment outside of the vehicle remains readily and absolutely known without calibration, and may be accurately controlled remotely.

Example 3—Human Operated Equipment Holding Device in Operational Environment

The device mount provided in Example 2 is provided affixed to a machine gun. The device mount is mounted to the exterior of an M1 Abrams Tank, and connected wirelessly to a remote terminal.

The remote terminal receives and indicates the position data from the device mount. A human operates the device mount to position the equipment based on a predetermined absolute position, or pre-recorded position. The remote terminal indicates to the human operator when the desired position of the equipment is reached.

Other Embodiments

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The foregoing description is illustrative of particular embodiments of the invention, but is not meant to be a limitation upon the practice thereof. The following claims, including all equivalents thereof, are intended to define the scope of the invention.

The invention claimed is:

1. A device mount for holding equipment to be interactively and directly used in a virtual reality or augmented reality setting by an operator engaging in the virtual reality or augmented reality setting, the device mount comprising:
    an equipment holding portion for holding equipment to be interactively used in a virtual reality or augmented reality setting, said equipment holding portion intended to be manipulated by said operator;
    a base portion connected to an equipment holding portion, wherein said base portion or said equipment holding portion, or the connection therebetween, have at least one axis of rotation;
    at least one gear at said at least one axis of rotation;
    at least one encoder having at least one encoder gear, wherein said encoder gear is engaged with said gear at said at least one axis of rotation, and wherein said encoder receives position information from said encoder gear; and
    at least one processor for receiving position information from said encoder and communicating said position information for integration into a virtual reality or augmented reality program for real-time interactive response.

2. The device mount of claim 1 wherein said base portion has at least one axis of rotation for rotating the equipment holding portion on said axis of rotation of the base portion.

3. The device mount of claim 1 wherein said equipment holding portion has at least one axis of rotation for rotating the equipment.

4. The device mount of claim 1 wherein said encoder is an absolute encoder providing absolute position data of the encoder gear and records multiple turns of the encoder shaft.

5. The device mount of claim 1 wherein said encoder further comprises an optical sensor for detecting light from an LED on said gear at said at least one axis of rotation to provide a calibration reference for the encoder to calibrate the encoder gear position information.

6. The device mount of claim 1 wherein said encoder for said base portion tracks the deflection angle (horizontal) of the equipment.

7. The device mount of claim 1 wherein said encoder for said equipment holding portion tracks the elevation angle (altitude) of the equipment.

8. The device of claim 1 wherein said encoder incorporates a code disk to provide an absolute position of the encoder gear, wherein the position information of the encoder gear is transcoded in binary, binary coded decimal, or gray code.

9. A method for zero drift equipment position tracking in a simulated (virtual reality or augmented reality) environment, the method comprising:
    attaching at least one encoder having at least one encoder gear to at least one gear on at least one axis of rotation of an equipment mount to be interactively and directly used in a virtual reality or augmented reality setting by an operator engaging in the virtual reality or augmented reality setting;
    receiving position information from the encoder based on the position of the encoder gear;
    determining using a processor one or more position angles of the equipment (azimuth or altitude angles) communicated from the encoder; and
    communicating said position angles in real-time to a simulated environment.

10. The method of claim 9 wherein said encoder is an absolute position encoder.

11. The method of claim 9 further comprising using an optical sensor within said encoder and a light source along with said gear of the axis of rotation and self-calibrating the position data upon the optical sensor sensing the light source with said gear.

12. The method of claim 11 wherein the gear on the rotation of axis is between said light source and said optical sensor, said gear further comprising a hole or slit at a position on the gear for which calibration of the position data is to be established.

13. A system for providing zero drift equipment position tracking in a simulated (virtual reality or augmented reality) environment, the system comprising:
    at least one device mount, said device mount comprising:
        i) an equipment holding portion for holding equipment to be interactively and directly used in a virtual reality or augmented reality setting, said equipment holding portion intended to be manipulated by said operator;
        ii) a base portion connected to an equipment holding portion, wherein said base portion or said equipment holding portion, or the connection therebetween, have at least one axis of rotation;
        iii) at least one gear at said at least one axis of rotation;
        iv) at least one encoder having at least one encoder gear, wherein said encoder gear is engaged with said gear at said at least one axis of rotation, and wherein said encoder receives position information from said encoder gear; and
        v) at least one processor for receiving position information from said encoder and communicating said position information for integration into a virtual reality or augmented reality program for real-time interactive response;
    a computer used for image generating of a simulated environment;
    wherein, said device mount is operated by a user in a simulated environment, said encoder determining the position or angle of the equipment as it is being manipulated and moved in the simulated environment, said position information being generated by the encoder being processed by the at least one processor and communicated to the image generating computer to illustrate in real-time the movement and manipulation of the equipment used with the device mount in the simulated environment.

* * * * *